United States Patent
Wörner

(10) Patent No.: US 6,926,074 B2
(45) Date of Patent: Aug. 9, 2005

(54) EXHAUST GAS COOLER

(75) Inventor: Siegfried Wörner, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/061,751

(22) Filed: Feb. 1, 2002

(65) Prior Publication Data

US 2002/0144803 A1 Oct. 10, 2002

(30) Foreign Application Priority Data

Feb. 1, 2001 (DE) .......................................... 101 04 835

(51) Int. Cl.⁷ ................................................ F28F 9/22
(52) U.S. Cl. ...................... 165/159; 165/139; 165/168
(58) Field of Search ............... 165/96, 160, 139, 165/173, 174, 175, 908, 135, 177, 168, 169, 159; 415/115, 116

(56) References Cited

U.S. PATENT DOCUMENTS

| | | | | |
|---|---|---|---|---|
| 1,783,465 A | * | 12/1930 | Fox | 165/89 |
| 4,201,195 A | * | 5/1980 | Sakhuja | 126/675 |
| 4,215,742 A | * | 8/1980 | Weed | 165/51 |
| 4,685,292 A | * | 8/1987 | Brigham et al. | 165/159 |
| 4,694,894 A | * | 9/1987 | Kito et al. | 165/135 |
| 4,928,749 A | * | 5/1990 | Paull | 165/119 |
| 5,040,380 A | * | 8/1991 | Gregory | 165/908 |
| 5,314,009 A | * | 5/1994 | Yates et al. | 165/75 |
| 5,363,654 A | * | 11/1994 | Lee | 60/752 |
| 5,467,815 A | * | 11/1995 | Haumann et al. | 165/908 |
| 5,480,281 A | * | 1/1996 | Correia | 415/115 |
| 6,230,669 B1 | * | 5/2001 | Evans | 123/41.5 |

FOREIGN PATENT DOCUMENTS

| | | | |
|---|---|---|---|
| DE | 297 08 011 U1 | 10/1998 | F28D/7/00 |
| EP | 1 031 708 A1 | 1/2000 | F01N/3/08 |
| WO | PCT/WO99/60255 | 11/1999 | F01N/3/20 |

* cited by examiner

Primary Examiner—Tho v Duong

(57) ABSTRACT

An exhaust gas cooler for an internal combustion engine, preferably in a motor vehicle, includes a housing through which exhaust gas can flow in the longitudinal direction and in which a partition extends in the longitudinal direction and separates a first chamber from a second chamber. An inlet communicates in the housing with a first chamber and through which the exhaust gas flows into the housing. An outlet communicates in the housing at least with the second chamber and via which the exhaust gas flows out of the housing. The partition has at least one overflow opening through which the first chamber communicates with the second chamber.

14 Claims, 3 Drawing Sheets

EXHAUST GAS COOLER

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to an exhaust gas cooler, particularly for internal combustion engines, which are preferably arranged in motor vehicles.

TECHNICAL FIELD

Exhaust gas cleaning elements, such as e.g. catalyst and/or $NO_x$ collector, are contained in the exhaust gas train of an internal combustion engine. In order to be able to ensure the orderly functioning of such exhaust gas cleaning elements, it can be required to adhere to a predetermined temperature window, e.g., 250° C.–550° C., and possibly a maximum temperature of, e.g., 800° C., in the exhaust gases, for given exhaust gas cleaning elements, e.g., for a $NO_x$ collector. In order to avoid an overheating of the temperature-sensitive exhaust gas cleaning elements, exhaust gas coolers of the kind mentioned at the beginning are used. A portion of the heat energy is conducted away by means of the exhaust gas cooler from the exhaust gases flowing through it, in particular into the surroundings. However, the problem exists here of attaining a minimum exhaust gas temperature (e.g., the lower temperature of the said temperature window, about 250° C.) in a cold start of the internal combustion engine, in order to ensure low pollutant emissions in the warming-up operation of the internal combustion engine also.

It is known from WO 99/60255 to build an exhaust gas cooler into an exhaust gas system of an internal combustion engine, a bypass duct furthermore being provided, bypassing the heat exchanger. The amount of exhaust gas which flows through the exhaust gas cooler or the bypass can be regulated with a controllable valve. Correspondingly, the exhaust gas temperature upstream of a catalyst device can be regulated. Such an arrangement has a relatively expensive construction, however.

A combination of a collector-catalyst and a cooling module is known from EP 1 031 708 A1, with the cooling module consisting of a pipe bundle with an inlet cone and an outlet cone. The outlet cone of the cooling module is integrated into the inlet cone of the catalyst, giving a compact construction. This known integral combination of a catalyst with a cooling module has the disadvantage, however, that the cooling module constantly works with full cooling capacity, with the consequence that the minimum temperature of the catalyst can only be reached relatively slowly in warming-up operation of the internal combustion engine.

SUMMARY OF THE INVENTION

The present invention is concerned with the problem of providing an embodiment for an exhaust gas cooler of the kind mentioned at the beginning, which has a particularly compact construction. Furthermore, the exhaust gas cooler is to be easily produced.

This problem is solved by an exhaust gas cooler comprising a housing through which exhaust gas flows in a longitudinal direction and in which a partition extends in the longitudinal direction and separates a first chamber from a second chamber, with an inlet which communicates in the housing with the first chamber and through which the exhaust gas flows into the housing, and an outlet which communicates in the housing at least with the second chamber and via which the exhaust gas flows out of the housing, wherein the partition comprises at least one overflow opening through which the first chamber communicates with the second chamber.

The invention is based on the general concept of constructing in a housing two chambers which extend in the inflow direction or in the outflow direction of the exhaust gas, and which communicate with one another via at least one overflow opening; the exhaust gases introduced into the first chamber are deflected transversely of their inflow direction through the at least one overflow opening into the second chamber, and flow from this out of the housing in the outflow direction, for which a further deflection is required. A relatively intense heat transfer from the exhaust gas to the housing takes place due to the relatively strong flow deflection in the housing. Since the two chambers directly adjoin one another and have a common partition, the exhaust gas cooler according to the invention is of very compact construction. Furthermore, the exhaust gas cooler according to the invention has a construction which can be easily produced.

A particularly advantageous embodiment results when a changeover device is arranged in the outlet and can be displaced between a first position, in which the outlet communicates with the second chamber, and a second position, in which the outlet communicated with the first chamber. In this embodiment, the exhaust gas cooler is adjustable between stages of two cooling capacity.

In the first position of the changeover device, the exhaust gases flow into the first chamber and out of the second chamber. The said intensive cooling effect thereby results. In the second position of the changeover device, the exhaust gases flow into the first chamber and also out of the first chamber again, substantially constituting a throughflow of the first chamber. The cooling capacity which can then be attained is relatively small, so that this advantageous embodiment is particularly suitable for attaining as quickly as possible a predetermined minimum temperature in an exhaust gas cleaning element, e.g., a $NO_x$ collector, during a warming-up phase of an internal combustion engine. In the warming-up phase, the changeover device is adjusted into its second position, in which the exhaust gas cooler displays its low cooling capacity. In normal operation, the first position of the changeover device can be set, in which the exhaust gas cooler displays its maximum cooling capacity.

In an appropriate development, the changeover device can also be constituted such that at least one intermediate position can be set, in which the outlet communicates more or less strongly with both chambers. In this development, the cooling capacity of the exhaust gas cooler can be set between its minimum cooling capacity, which is obtained in the second position of the changeover device, and its maximum cooling capacity, which is obtained in the first position of the changeover device. A stepless or relatively finely stepped adjustability is appropriate here.

In an appropriate configuration, both chambers can end with their outlet ends open in or at the outlet, the changeover device then having a flap arrangement which closes the outlet end of the first chamber in the first position of the changeover device, and which closes the outlet end of the second chamber in the second position of the changeover device. This embodiment is distinguished by its simple construction and can thus be easily produced and at a favorable price.

In a particularly inexpensive embodiment, the housing can be assembled from an upper shell, a lower shell, and an inner shell which forms the partition. Suitable for this assembly, for example, are folding processes with edged connections, or welding processes, particularly laser welding processes.

The cooling capacity of the exhaust gas cooler can be improved, for example, by the construction of plural channels running in the longitudinal direction in the housing, the partition in each of the channels separating a first partial channel from a second partial channel; the partition in each of the channels having at least one overflow opening through which the partial channels of the respective channel communicate with one another, with the first partial channels forming the first chamber and the second partial channels forming the second chamber. By this multi-channel construction, more surfaces are available for heat transfer, so that on the one hand the cooling capacity is increased for the same constructional length, and on the other hand, the constructional length can be reduced for the same cooling capacity. Furthermore, the cooling capacity of the exhaust gas cooler can be adapted to different requirements by means of the number of channels.

An embodiment of particular advantage is one in which very many overflow openings having relatively small cross sections are provided, so that a large number of such overflow openings is formed by a perforation of the partition or at least of a partition section. There results in this manner an intensive mixing, vorticity and turbulence in the exhaust gas flow, so that the heat transfer at the walls is improved. Furthermore, it has been found that a more or less strong muffling effect is attainable by means of such a perforation, so that the exhaust gas cooler according to the invention is also effective as a muffler.

In another particular embodiment, the partition can be mounted on the housing in an inlet region and in an outlet region by means of a sliding seat mounting, the partition being connected securely to the housing in a middle region arranged between the inlet region and the outlet region. This particular construction results in a decoupling of the partition and the housing in the inlet region and outlet region, so that thermal expansion effects are reduced or compensated.

The cooling effect of the exhaust gas cooler can be improved in a development, in which the cross sections of the chambers is respectively greater than the cross section of the inlet and than the cross section of the outlet. By this measure, the flow speed is relaxed or reduced within the housing. Heat transfer between the exhaust gas and the housing can hereby be improved.

Further important features and advantages of the invention will become apparent from the dependent claims, from the drawings, and from the associated description of the Figures with the aid of the drawings.

It will be understood that the features stated hereinabove and still to be explained hereinafter can be used not only in the respectively given combination, but also in other combinations or singly, without departing from the scope of the present invention.

BRIEF DESCRIPTION OF THE INVENTION

Preferred embodiment examples of the invention are shown in the drawings and are described in more detail in the following description.

Respectively schematically,

DETAILED DESCRIPTION OF THE INVENTION

Figure 1:
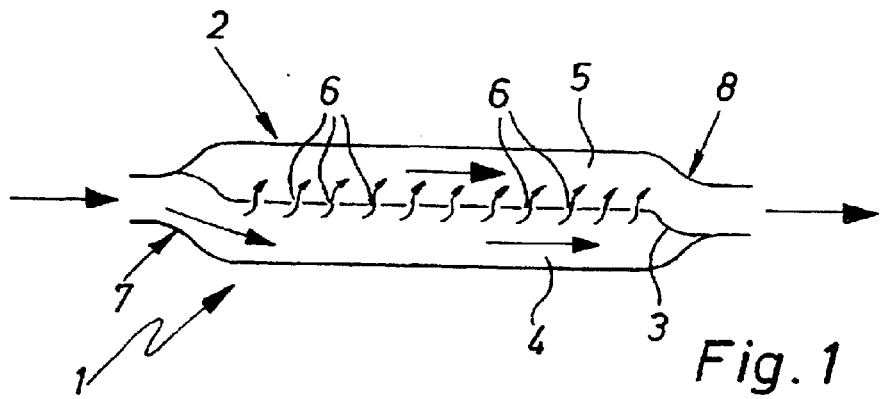
FIG. 1 shows a longitudinal section through an exhaust gas cooler according to the invention in a first embodiment.

Corresponding to FIG. 1, an exhaust gas cooler 1 according to the invention has a housing 2 through which exhaust gas can flow in its longitudinal direction. The exhaust gas throughflow of the housing 2 is symbolized here with arrows. In the housing 2, the partition 3, which extends in the longitudinal direction of the housing 2, separates a first chamber 4 from a second chamber 5. The partition 3 has a large number of throughflow openings 6, which have relatively small cross sections, and through which the two chambers 4 and 5 communicate with one another. The exhaust gas cooler 1 furthermore has an inlet 7 which communicates in the housing 2 with the first chamber 4. The exhaust gas flow enters the housing 2, or the first chamber 4, through the inlet 7. Furthermore, the exhaust gas cooler 1 has an outlet 8 which communicates in the housing 2 with the second chamber 5, so that the exhaust gas flow exits through the outlet 8 from the housing 2 or from the second chamber 5.

The exhaust gas flow entering the housing 2 through the inlet 7 is compelled by the closed outlet end of the second chamber 4 to overflow through the overflow openings 6 into the second chamber 5. There thereby results a double transverse deflection of the exhaust gas flow, with corresponding vorticity and heat transfer to the partition 3 and also to the housing 2. The cooled exhaust gas exits through the outlet 8 from the second chamber 5 or from the housing 2. With a great number of overflow openings 6, these can be formed by perforation of the partition 3 or of a corresponding partition section. The cross sections of the overflow openings 6 are small in comparison with the cross sections of the chambers 4 and 5, so that a throttle action arises at the overflow openings 6. As a result of this, the exhaust gas cooler 1 can additionally display a muffling effect.

Figure 2:
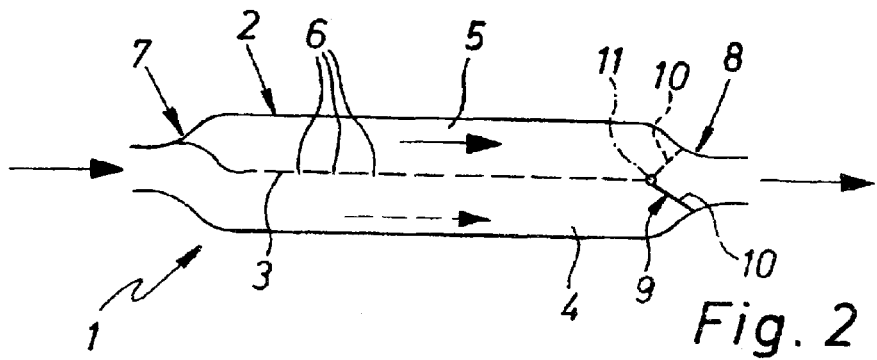
FIG. 2 shows a view as in FIG. 1, but for a second embodiment.

Corresponding to FIG. 2, in a preferred embodiment a changeover device 9 can be arranged in the outlet 8 or in an outlet region; it has a flap 10 here. This flap 10 is pivotably mounted about a pivot axis 11 running perpendicular to the exhaust gas flow, and here standing perpendicular to the plane of the drawing. The changeover device 9 or its flap 10 is adjustable by means of corresponding positioning means (not shown), between a first position shown by a full line and a second position shown by a dashed line. In the first position of the changeover device 9 or of the flap 10, the flap 10 blocks the outlet end of the first chamber 4 and frees the outlet end of the second chamber 5, so that the outlet 8 in the first position communicates with the second chamber 5. In the first position, the same course of flow results as in the embodiment according to FIG. 1, which means that the exhaust gases flow through the inlet 7 into the first chamber 4, overflow via the overflow openings 6 into the second chamber 5, and exit from the second chamber 5 through the outlet 8.

In the second position of the changeover device 9 or of the flap 10, the flap 10 blocks the outlet end of the second chamber 5 and opens the outlet end of the first chamber 4, so that the outlet 8 in the second position communicates with the first chamber 4. There thus results the following exhaust gas flow: the exhaust gas enters the first chamber 4 through the inlet 7, and cannot enter the chamber 5 through the overflow openings 6, because this chamber is obstructed at its outlet end, so that the exhaust gas exits from the first chamber 4 through the outlet 8. It is clear that the cooling effect of the exhaust gas cooler 1 is considerably smaller in this second position than in the previously described first position of the changeover device 9.

Figure 3:
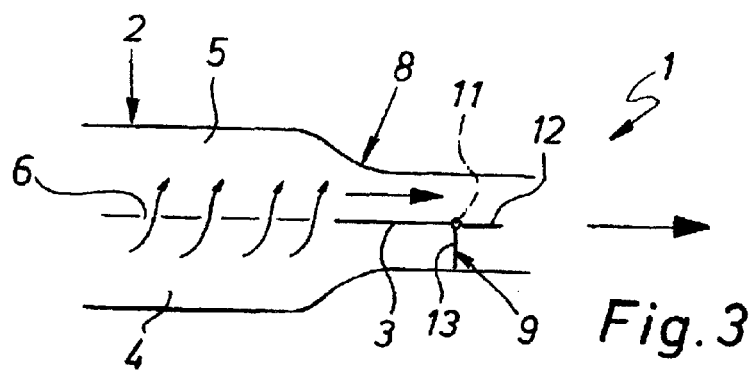
FIG. 3 shows a longitudinal section through the outlet region of the exhaust gas cooler according to the invention, but in a third embodiment in a first operating state.
Figure 4:
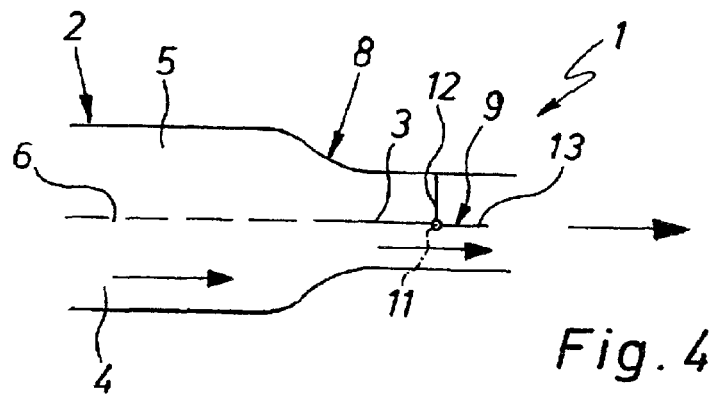
FIG. 4 shows a view as in FIG. 3, but in a second operating state.

In the embodiment according to FIGS. 3 and 4, the partition 3 extends in as far as the outlet 8, and divides, in particular into halves, the cross section within the outlet 8 through which a flow can pass. A changeover device 9 is again arranged in the outlet 8 at the outlet end of the partition 3. In this embodiment, the changeover device 9 has a flap arrangement with a first flap 12 and a second flap 13 which are arranged mutually offset by about 90°. This flap arrangement 12, 13 is again pivotably mounted about a pivot axis 11, perpendicular to the flow direction and here perpendicular to the plane of the drawing, and is operable with corresponding positioning means (not shown). In FIG. 3, the changeover device 9 assumes its first position in which the first flap 12 opens the outlet end of the second chamber 5, while the second flap 13 blocks the outlet end of the first chamber 4. Thus a flow begins through the overflow openings 6, so that the exhaust gases exit from the second chamber 5 through the outlet 8, with stronger cooling effect.

In FIG. 4, the changeover device 9 is switched into its second position, in which the first flap 12 blocks the outlet end of the second chamber 5, while the second flap 13 frees the outlet end of the first chamber 4. Correspondingly, there results in the housing 2 no intensive throughflow through the overflow openings 6, so that the exhaust gas flow exits, cooled comparatively little, from the second chamber 4 through the outlet 8.

It is clear that the changeover device 9 of FIGS. 3 and 4 can also basically manage with one flap. The embodiment with two flaps 12, 13 has the advantage, however, that a corresponding adjusting member has to effect a relatively small displacement path.

Furthermore it is appropriate if the changeover device 9 in the embodiments of FIGS. 2–4 is constituted such that at least one intermediate position can be set, situated between the first position and the second position, so that the outlet 8 communicates both with the first chamber 4 and also with the second chamber 5. In dependence on the respective intermediate position, there then results a more or less strong flow through the overflow openings 6, by means of which the cooling capacity of the exhaust gas cooler 1 can be set greater or smaller.

Figure 5:
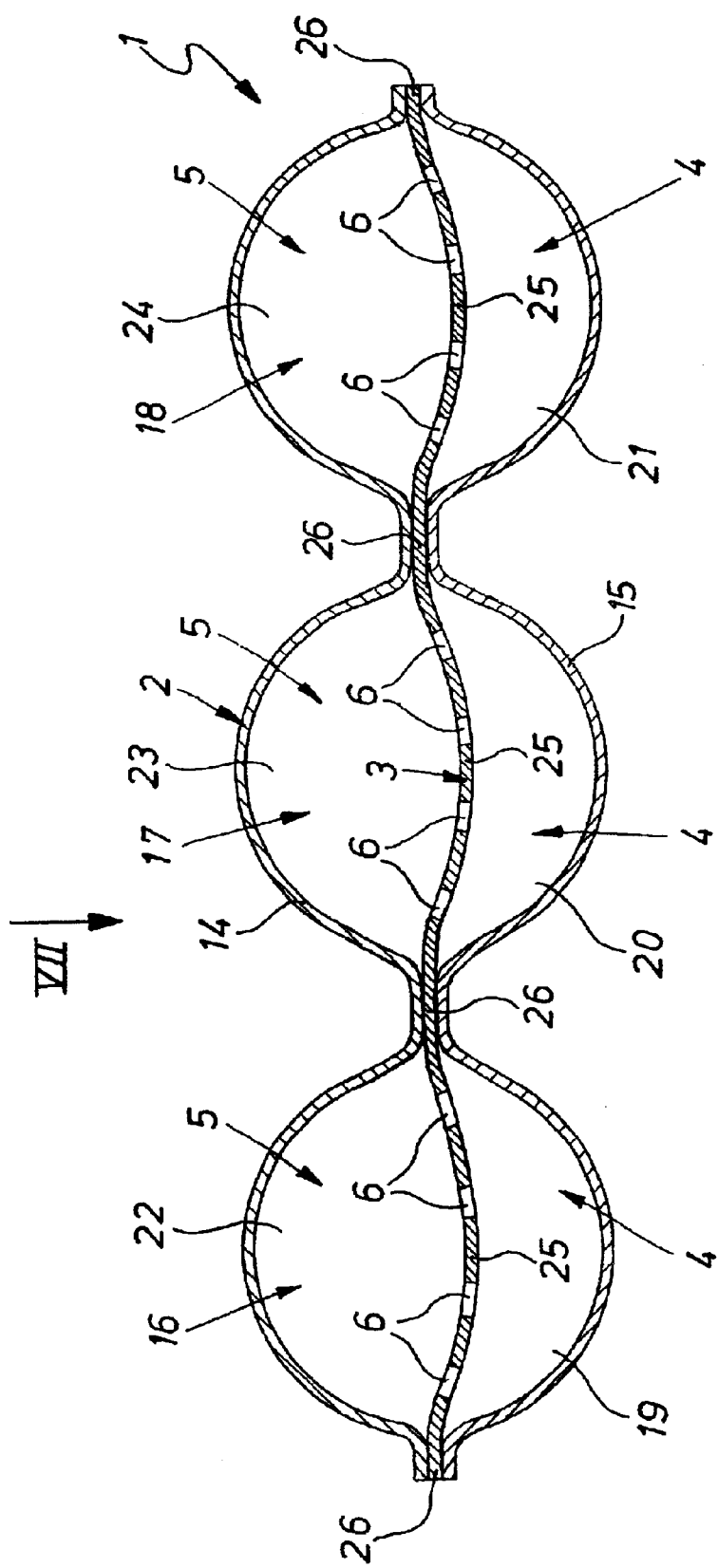
FIG. 5 shows a cross section through a particular embodiment of an exhaust gas cooler according to the invention.

Corresponding to FIG. 5, the housing 2 is assembled, in a preferred embodiment, from an upper shell 14, a lower shell 15, and an intermediate shell which forms the partition 3. The assembly takes place, for example, by a welding process or a folding process. The production of the housing 2 is thus relatively simple.

In the embodiment shown in FIG. 5, several channels 16, 17, 18 are moreover constituted in the longitudinal direction in the housing 2, thus perpendicular to the plane of the drawing. The partition 3 or inner shell then separates a first partial channel 19 or 20 or 21 from a second partial channel 22 or 23 or 24 in each of these channels 16, 17, 18. The partition 3 contains an overflow opening 6 in each of the channels 16, 17, 18, so that within the individual channels 16, 17, 18, their partial channels 19, 22 or 20, 23 or 21, 24 communicate with one another. In all, the first partial channels 19, 20, 21 together form the first chamber 4 of the housing 2, while the second partial channels 22, 23, 24 together form the second chamber 5. The wall surface available for heat transfer and subject to the exhaust gas flow is increased by the formation of separate channels. The cooling capacity of the exhaust gas cooler 1 is hereby increased.

The inner shell 3 or the partition 3 thus has three separating sections 25 running longitudinally and four connecting sections 26, likewise running longitudinally. A respective one of the separating sections 25 is then arranged between two adjacent connecting sections 26. In the region of the connecting sections 26, the upper shell 14 and lower shell 15 abut on the inner shell 3, or are connected to it, e.g. by laser welding. Differing from this, the separating sections 25 in the channels 16, 17, 18 separate the partial channels from one another, the separating sections 25 containing the overflow openings 6.

By this means the housing 2 can have a simple construction, even with plural channels 16, 17, 18.

According to FIG. 5, the channels 16, 17, 18 have a substantially circular cross section; basically, another cross section is also possible. As is apparent from FIG. 5, the inner shell 3, in the region of its separating sections 25, has a convex curvature toward the respective first chamber 4. A stiffening of the whole structure results from this. Furthermore, a throughflow cross section for the second chamber 5 results which is greater than the throughflow cross section of the first chamber 4.

Figure 6:
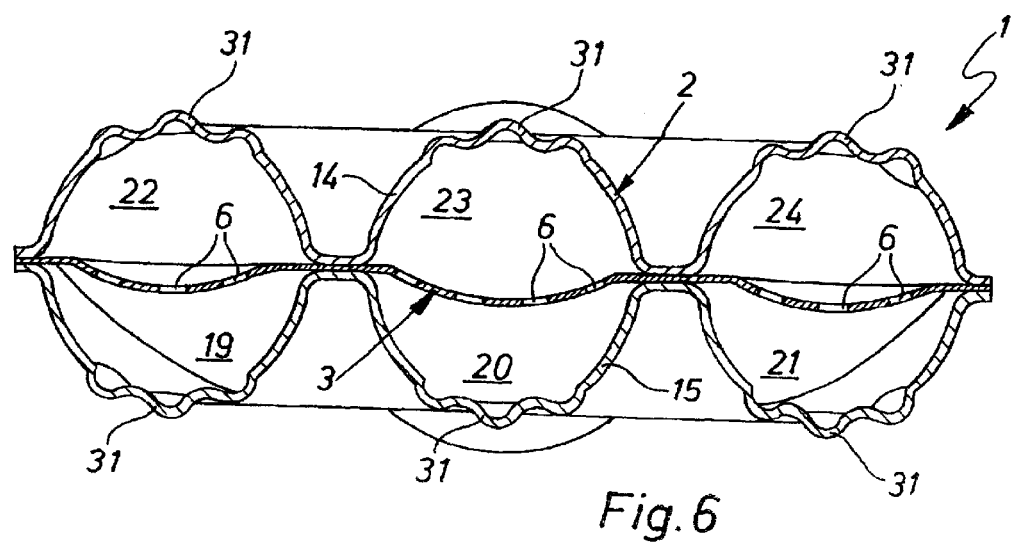
FIG. 6 shows a view as in FIG. 5, but in another embodiment.

Corresponding to FIG. 6, the housing 2 can have outward-directed regions on its walls or on its upper shell 14 and also on its lower shell 15, these regions respectively having a structure 31 which increases the surface area. For example, in FIG. 6 this structure 31 is formed by corrugations running in the longitudinal direction of the housing 2. The surface of the housing 2 exposed to the exhaust gas flowing through is increased by means of this structure 31, so that the heat transfer between exhaust gas and exhaust gas cooler 1 is improved. Correspondingly, the cooling capacity of the exhaust gas cooler according to the invention can be improved by this structuring of the housing walls, or of the upper shell 14 and the lower shell 15.

Figure 7:
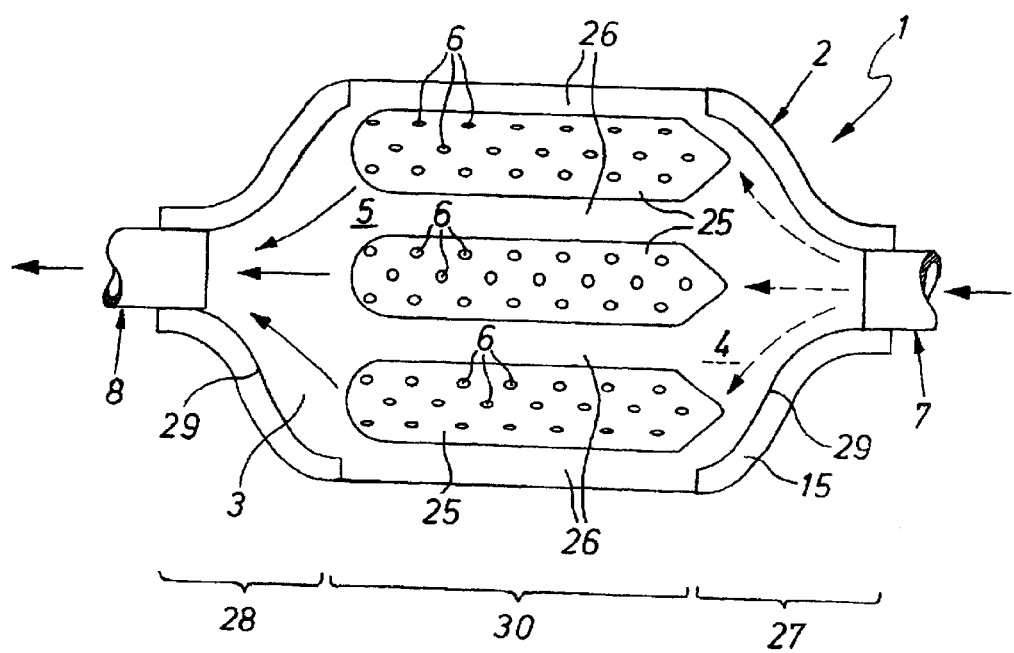
FIG. 7 shows a view from above, with the upper shell removed, of a particular embodiment of the exhaust gas cooler according to the invention.

A plan view of the exhaust gas cooler according to the invention is reproduced in FIG. 7, as seen in the direction of the arrow VII in FIG. 5, the upper shell 14 being omitted. Correspondingly, the second chamber 5 is visible, while the first chamber 4 is covered by the partition 3 or the inner shell 3. Correspondingly, exhaust gas flows into the covered first chamber 4 at the inlet 7, and, with corresponding positioning of the changeover device 9 which may be present, enters through the overflow channels 6 into the visible second chamber 5. From there the cooled exhaust gas flow exits from the housing 2 through the outlet 8. The separating sections 25, perforated with a large number of overflow openings 6, can be clearly seen in FIG. 7.

FIG. 7 shows a particular construction of the housing 2, in which the partition 3 in an inlet region 27 denoted by a brace, and likewise an outlet region 28 denoted by a brace, are respectively mounted on the housing 2 by means of a sliding seat mounting 29. Furthermore, the partition 3 is securely connected, for example by a welded joint, to the housing 2 in a middle region 30, denoted by a brace, arranged between the inlet region 27 and the outlet region 28. With the housing 2 assembled from upper shell 14, inner shell 3 and lower shell 15, the external connecting sections 26 extend in this middle section 30 as far as the outer edge of the upper shell 14 and lower shell 15 so that the inner shell 3 can be easily secured in this region. By means of this method of construction, compensation movements between the partition 3 and the rest of the housing 2 can take place in the inlet region 27 and in the outlet region 28 without critical distortions arising.

In this middle region 30, the chambers 4, 5 or respectively the channels 16, 17, 18 respectively have constant flow cross sections. Correspondingly, the cross section of the housing 2 in the middle region is also constant.

The exhaust gas cooler 1 is arranged, for example, in the exhaust gas system of internal combustion engines. The use is preferably in an internal combustion engine which is arranged in a motor vehicle. For example, the exhaust gas cooler 1 is positioned on the vehicle at a place exposed to the airflow. In an appropriate development, a fan can furthermore be provided to effect or strengthen the exposure of the exhaust gas cooler 1 to cooling air.

The general dimensioning of the exhaust gas cooler 1 or of its chambers 4 and 5 is preferably chosen so that the flow cross section of the first chamber 4 and the flow cross section of the second chamber 5 are respectively greater than the flow cross section at the inlet 7 and also at the outlet 8. There results by this means a reduction of the flow speed, which has an advantageous effect on the cooling action of the exhaust gas cooler 1.

List of Reference Numerals

| | |
|---|---|
| 1 | exhaust gas cooler |
| 2 | housing |
| 3 | partition |
| 4 | first chamber |
| 5 | second chamber |
| 6 | overflow opening |
| 7 | inlet |
| 8 | outlet |
| 9 | changeover device |
| 10 | flap |
| 11 | axis |
| 12 | first flap |
| 13 | second flap |
| 14 | upper shell |
| 15 | lower shell |
| 16 | channel |
| 17 | channel |
| 18 | channel |
| 19 | first partial channel of 16 |
| 20 | first partial channel of 17 |
| 21 | first partial channel of 18 |
| 22 | second partial channel of 16 |
| 23 | second partial channel of 17 |
| 24 | second partial channel of 18 |
| 25 | separating section of 3 |
| 26 | connecting section of 3 |
| 27 | inlet region |
| 28 | outlet region |
| 29 | sliding seat mounting |
| 30 | middle region |
| 31 | structure |

I claim:

1. An exhaust gas cooler, comprising:
   a housing (2) through which exhaust gas flows in a longitudinal direction,
   a first chamber (4) and a second chamber (5) that extend in the housing,
   a partition (3) that extends in the housing in the longitudinal direction and separates the first chamber (4) from the second chamber (5),
   a section of the housing and the partition form a boundary of the first chamber and another section of the housing and the partition form a boundary of the second chamber
   an inlet (7) that communicates in the housing (2) with the first chamber (4) and through which the exhaust gas flows into the housing (2), and
   an outlet (8) that communicates in the housing (2) at least with the second chamber (5) and via which the exhaust gas flows out of the housing (2),
   wherein the partition (3) comprises at least one overflow opening (6) through which the first chamber (4) communicates with the second chamber (5) and a plurality of channels 16,17,18) running in the longitudinal direction in the housing (2), the partition (3) separating, in each of the plurality of channels (16,17,18), a first partial channel (19,20,21) from a second partial channel (22,23,24), and the partition comprising at least one said overflow opening (6) through which the partial channels of a respective channel communicate with on another, the first partial channels comprising the first chamber (4) and the second partial channels comprising the second chamber (5),
   wherein housing (2) comprises an upper shell (14), a lower shell (15), and an inner shell, forming the partition (3),
   wherein
   the inner shell comprises separating sections (25) running in the longitudinal direction and a plurality of connecting sections (26) running in the longitudinal direction, a respective separating section (25) is arranged between two connecting sections (26) that are adjacent in a transverse direction, the upper shell (14) and the lower shell (15) abut or connect in the connecting sections (26), and the separating sections (25) respectively separate the first partial channel (19, 20, 21) from the second partial channel (22, 23, 24) in one of the channels (16, 17, 18), and comprise at least one overflow opening (6).

2. The exhaust gas cooler according to claim 1, further comprising a changeover device (9) arranged in a region of the outlet, and adjustable between a first position in which the outlet (8) communicates with the second chamber (5), and a second position in which the outlet (8) communicates with the first chamber (4).

3. The exhaust gas cooler according to claim 2, wherein the changeover device (9) is settable in at least one intermediate position in which the outlet (8) communicates more or less with bath first and second chambers (4, 5).

4. The exhaust gas cooler according to claim 2, wherein both the first chamber d the second chamber (4, 5) comprise outlet ends that open in or at the outlet (8), and
   wherein the changeover device (9) comprises a flap arrangement (12, 13) that in the first position of the changeover device (9) closes the outlet end of the first chamber (4) and in the second position of the changeover device (9) closes the outlet end of the second chamber (5).

5. The exhaust gas cooler according to claim 1, wherein a substantially plurality of overflow openings (6) are formed by perforations of the partition (3) or at least one partition section (25).

6. The exhaust gas cooler according to claim 1, wherein the partition (3) is mounted in an inlet region (27) and in an outlet region (28) respective of the exhaust gas cooler via a sliding seat mounting (29), and the partition (3) is securely connected to the housing (2) in a middle region (30) of the exhaust gas cooler between the inlet region (27) and the outlet region (28).

7. The exhaust gas cooler according to claim 1, wherein the first an second chambers (4, 5) or the channels (16, 17, 18) have constant cross sections in the middle region (30).

8. The exhaust gas cooler according to claim 1, wherein the first and second chambers have cross section, that are respectively greater than a cross section of the inlet (7) and greater than a cross section of the outlet (8).

9. The exhaust gas cooler according to claim 1, wherein at least one wall of the housing or the upper shell (14) or the lower shell (15) comprises a structure (31) increasing the surface, at least regionally.

10. The exhaust gas cooler according to claim 9, wherein the structure (31) is selected from a corrugated, ribbed or pleated structure.

11. An exhaust gas cooler, comprising:
a housing (2) through which exhaust gas flows in a longitudinal direction,
a first chamber (4) and a second chamber (5) that extend in the housing,
a partition (3) that extends in the housing in the longitudinal direction and separates the first chamber (4) from the second chamber (5),
a section of the housing and the partition form a boundary of the first chamber and another section of the housing and the partition form a boundary of the second chamber
an inlet (7) that communicates in the housing (2) with the first chamber (4) and through which the exhaust gas flows into the housing (2), and
an outlet (8) that communicates in the housing (2) at least with the second chamber (5) and via which the exhaust gas flows out of the housing (2),
wherein partition (3) comprises at least one overflow opening (6) through which the first chamber (4) communicates with the second chamber (5),
wherein partition (3) is mounted in an inlet region (27) and in an outlet region (28) respectively of the exhaust gas cooler via a sliding seat mounting (29), and the partition (3) is securely connected to the housing (2) in a middle region (30) of the exhaust gas cooler between the inlet region (27) and the outlet region (28).

12. The exhaust gas cooler according to claim 11, wherein the first and second chambers (4, 5) or the channels (16, 17, 18) have constant cross sections in the middle region (30).

13. An exhaust gas cooler, comprising:
a housing (2) through which exhaust gas flows in a longitudinal direction,
a first chamber (4) and a second chamber (5) that extend in the housing,
a partition (3) that extends in the housing in the longitudinal direction and separates the first chamber (4) from the second chamber (5),
a section of the housing and the partition form a boundary of the first chamber and another section of the housing and the partition form a boundary of the second chamber,
an inlet (7) that communicates in the housing (2) with the first chamber (4) and through which the exhaust gas flows into the housing (2), and
an outlet (8) that communicates in the housing (2) at least with the second chamber (5) and via which the exhaust gas flows out of the housing (2),
wherein the partition (3) comprises at least one overflow opening (6) through which the first chamber (4) communicates with the second chamber (5), and
a plurality channels (16, 17, 18) running in the longitudinal direction in the housing (2), the partition (3) separating, in each of the plurality of channels (16, 17, 18), a first partial channel (19, 20, 21) from a second partial channel (22, 23, 24), and the partition comprising at least one said overflow opening (6) through which the partial channels of a respective channel communicate with one another,
the first partial channels comprising the first chamber (4) and the second partial channels comprising the second chamber (5).

14. The exhaust gas cooler according to claim 13, wherein the channels (16, 17, 18) comprise a substantially circular cross section.

* * * * *